April 20, 1965  A. KOLMAN  3,178,763
AUTOMATIC CARCASS WASHER
Filed Sept. 5, 1963  4 Sheets-Sheet 1
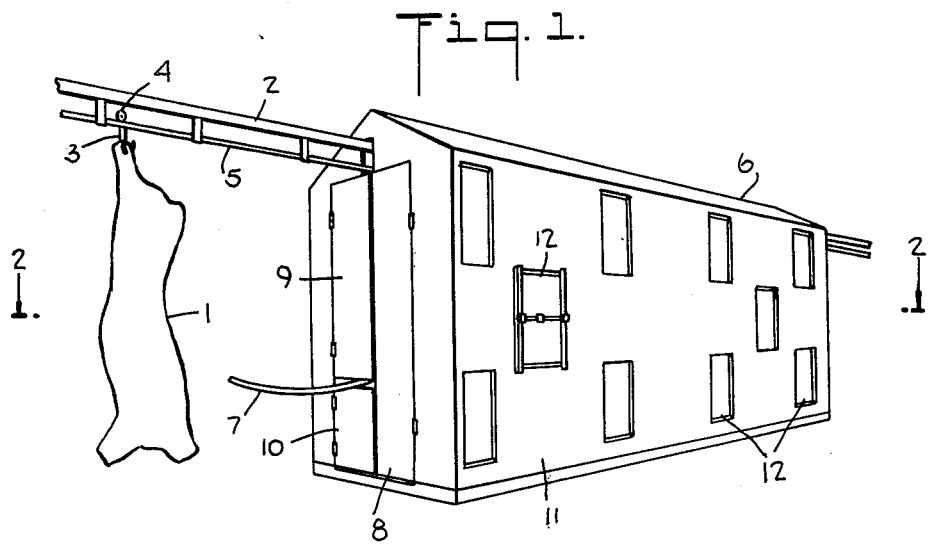
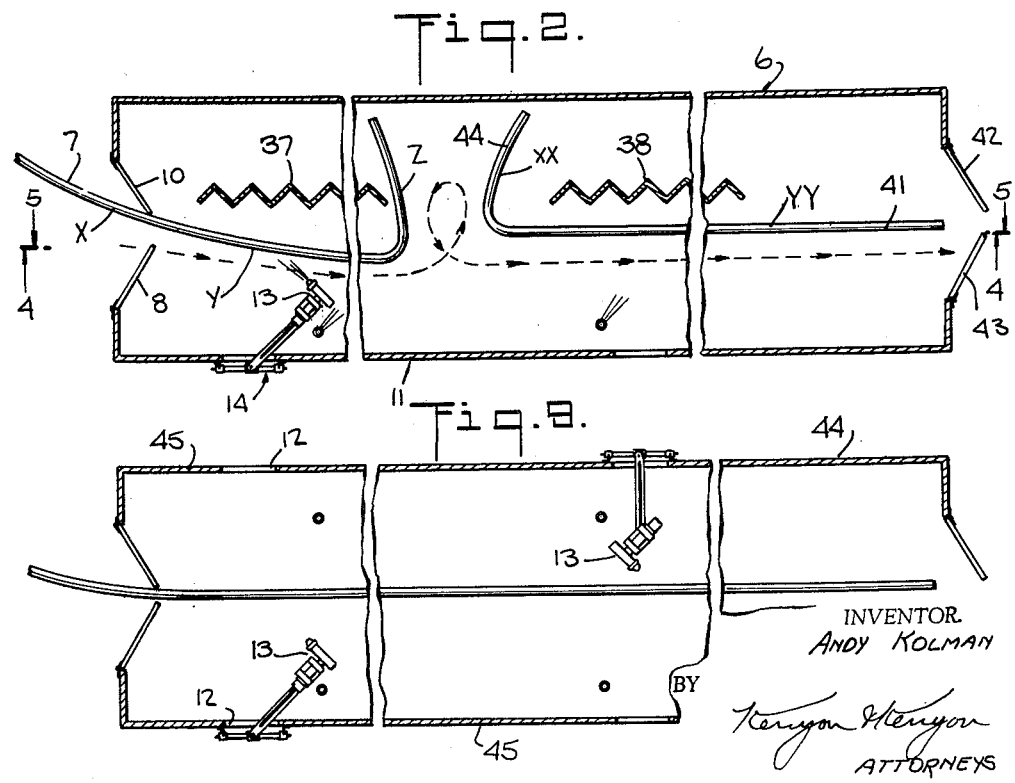
INVENTOR.
ANDY KOLMAN
BY
Kenyon & Kenyon
ATTORNEYS April 20, 1965  A. KOLMAN  3,178,763
AUTOMATIC CARCASS WASHER
Filed Sept. 5, 1963  4 Sheets-Sheet 2
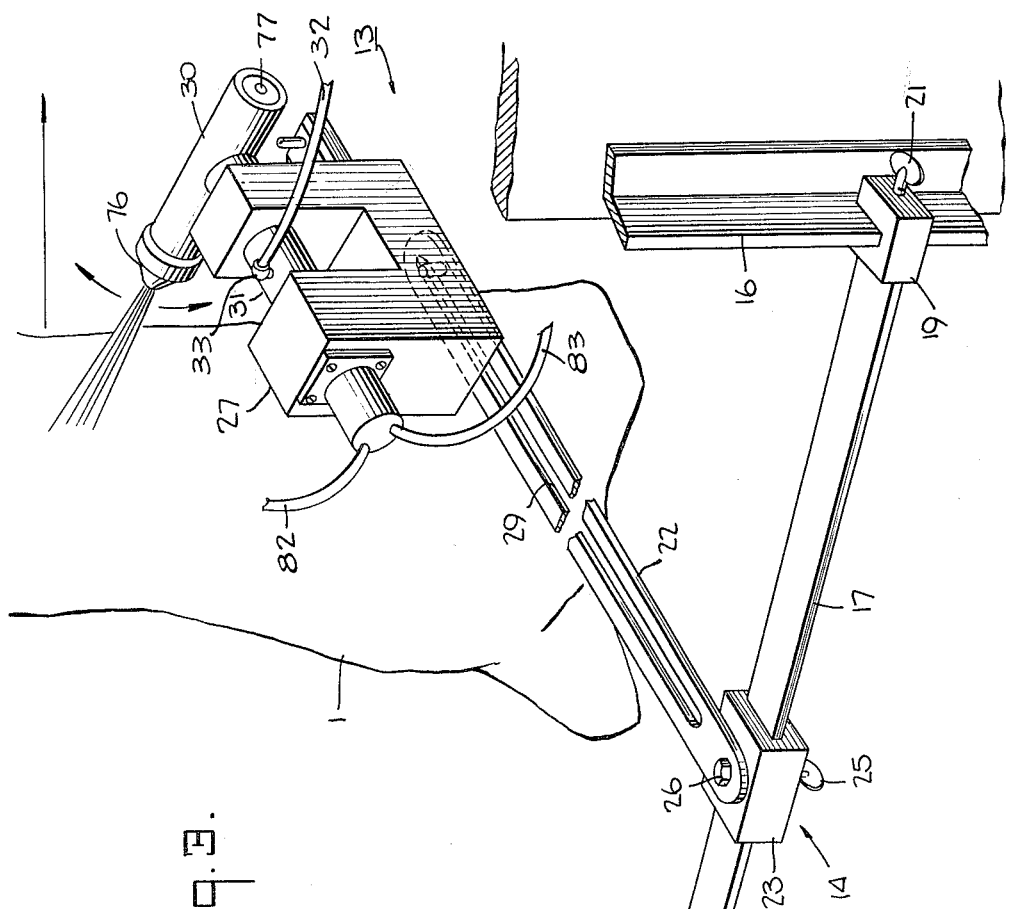
Fig. 3.
INVENTOR.
ANDY KOLMAN
BY
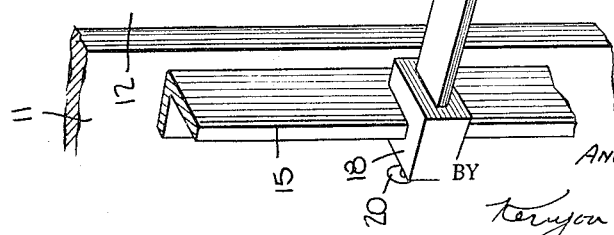
ATTORNEYS April 20, 1965  A. KOLMAN  3,178,763
AUTOMATIC CARCASS WASHER
Filed Sept. 5, 1963  4 Sheets-Sheet 3
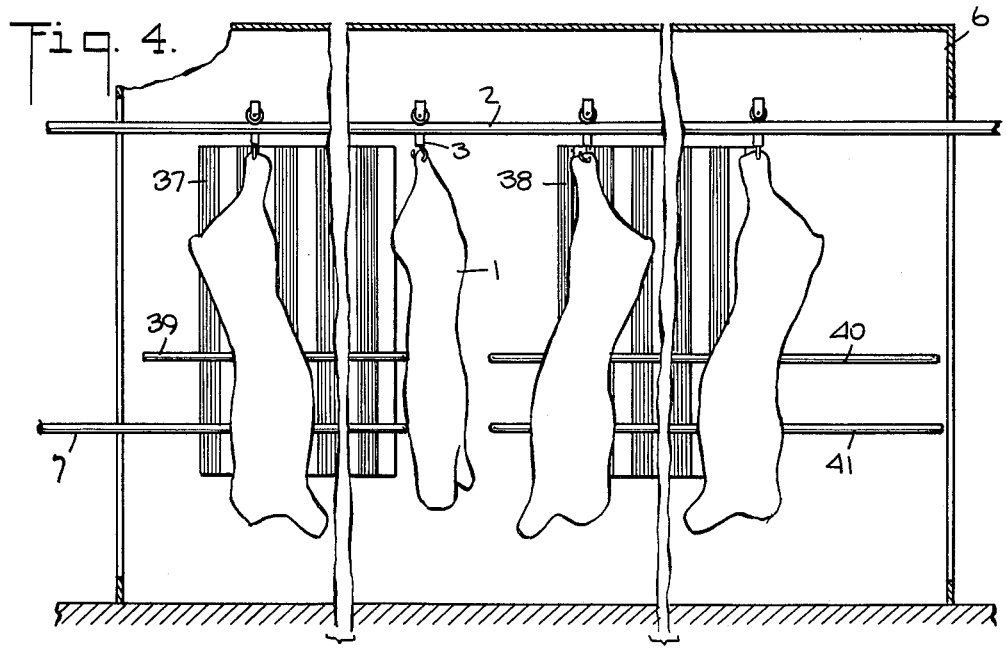
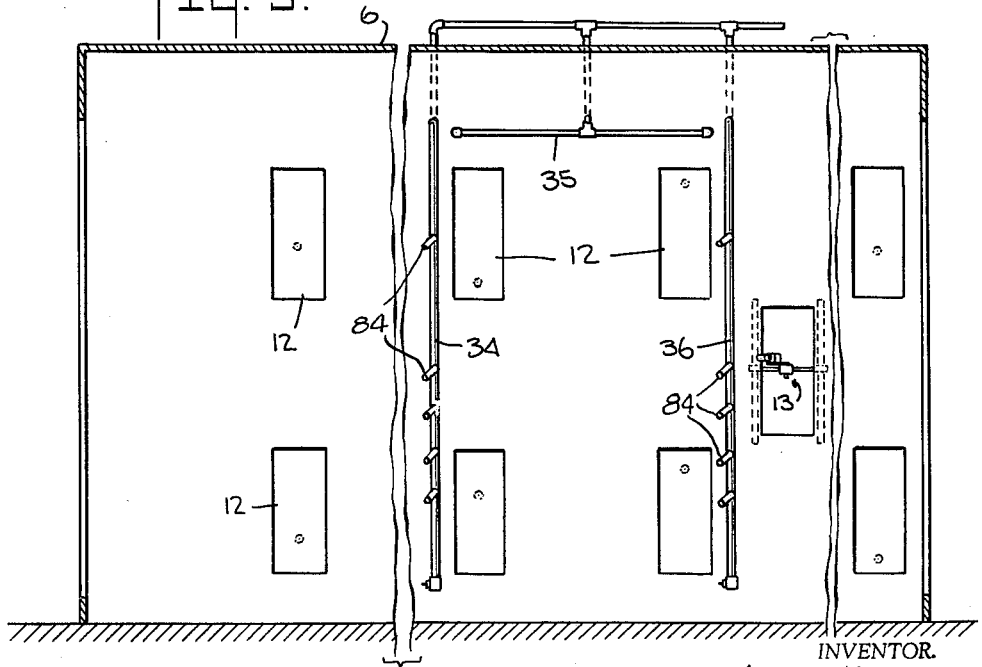
INVENTOR.
ANDY KOLMAN
BY
Kenyon & Kenyon
ATTORNEYS April 20, 1965  A. KOLMAN  3,178,763
AUTOMATIC CARCASS WASHER
Filed Sept. 5, 1963  4 Sheets-Sheet 4
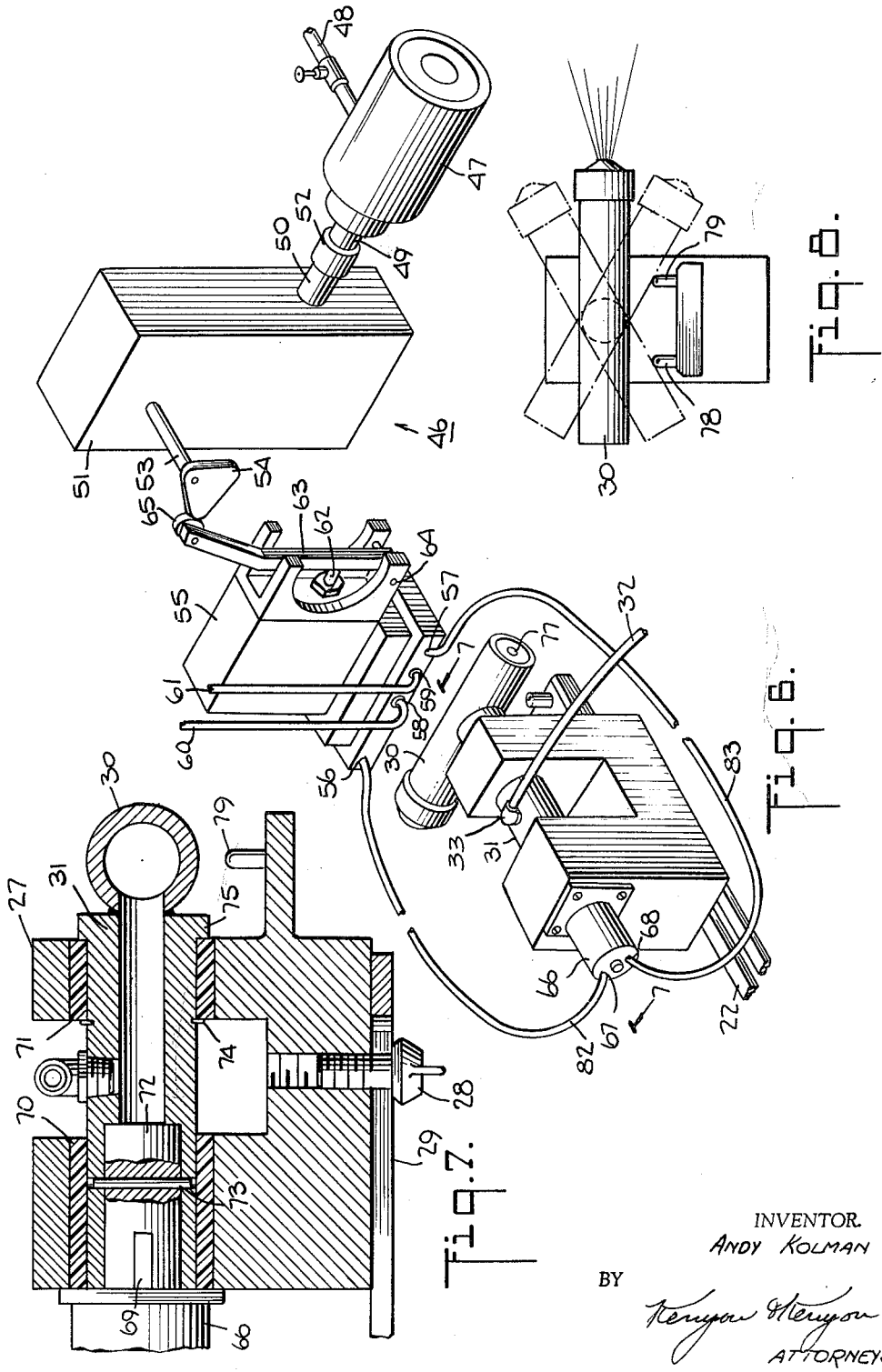
INVENTOR.
ANDY KOLMAN
BY
ATTORNEYS 3,178,763
AUTOMATIC CARCASS WASHER
Andy Kolman, Indianapolis, Ind., assignor to Hygrade Food Products Corporation, Detroit, Mich., a corporation of New York
Filed Sept. 5, 1963, Ser. No. 306,751
7 Claims. (Cl. 17—1)

This invention relates to animal carcass washers. More particularly, this invention relates to an automatic washer for washing the carcasses of slaughtered animals to be processed for human consumption.

It has become the practice in modern meat processing and packing plants to automate as many operations as possible from kill to final shipment of the processed meat. It is customary to suspend the carcasses or half-carcasses of slaughtered animals from a moving overhead conveyor so that the operations in the processing of the carcass may be done in a rapid and efficient manner. In present practice, the animal to be processed is slaughtered, the hide is removed, and various dressing operations are then performed on the carcass.

After final inspection and before shrouding of the carcass for shipment, the carcass is thoroughly washed to remove dirt and foreign matter collected from the repeated handling of the carcass in prior processing operations. At present, this final washing of the carcass is performed manually with high-pressure hoses. This method is unsatisfactory because the degree of cleanliness of the washed carcass varies in accordance with the skill and care of the operators of the hoses.

It is an object of this invention to provide an automatic animal carcass washer that will thoroughly cleanse an animal carcass.

It is another object of this invention to provide an automatic animal carcass washer which embodies a plurality of reciprocating rotary spray units for improved cleansing of the carcass.

It is a further object of this invention to provide an automatic animal carcass washer in which all of the sprays are directed in one direction and turning rails are employed to rotate the carcass 180° to expose both sides of the carcass to the sprays.

An additional object of this invention is to provide a reciprocating rotary spray unit for cleansing animal carcasses.

Briefly stated, one embodiment of the invention is an automatic carcass washer comprising a rectangular housing having a pair of parallel walls, and a set of spring-loaded double-acting swinging doors at the entrance and at the exit of said housing; an overhead conveyor rail parallel to said walls and extending through said housing, carcass carrying means co-acting with said rail and adapted to suspend the carcass from one end thereof and convey it through said housing; a plurality of window openings spaced along the length of one of said walls; a reciprocating rotary spray unit positioned in at least one of said window openings and adapted to provide a substantially vertically moving spray pattern directed generally at the other wall, said spray unit comprising a nozzle from which the spray emanates and means for reciprocating said nozzle in a substantially vertical plane whereby a substantially vertically moving spray pattern is produced; a plurality of stationary spray units located within said housing, each of which comprises a nozzle adapted to provide a fixed spray pattern directed generally at said other wall; a first carcass guide means located at the entrance of said housing to turn the suspended carcass so that it enters the swinging doors of said housing with one of the sides thereof facing said one wall; a second carcass guide means located within said housing and extending from the entrance to approximately the longitudinal center of said housing, said second guide means being shaped so that the first section thereof is slightly angled with respect to said conveyor rail and the second section thereof is arcuate and curves toward the other of said walls, the said first section of said second guide means being laterally offset from the conveyor rail toward said one wall with the amount of offset increasing with length whereby it bears against the lower portion of the suspended carcass and progressively displaces it toward said one wall; a third carcass guide means located within said housing and longitudinally spaced from said second guide means, said third guide means extending from approximately the longitudinal center of said housing to the exit thereof, said third guide means being shaped so that the first section thereof is arcuate in shape, curving away from the other of said walls, and the second section thereof is substantially parallel to said conveyor rail and in the same vertical plane; deflector means located within said housing and disposed between said second and said third guide means and the other of said walls; whereby said carcass is introduced into said housing by said first guide means through the entrance set of swinging doors with one side of said carcass exposed to the reciprocating spray units and said fixed spray units located in the housing between the entrance and the approximate longitudinal center of the housing, said carcass moves along said second guide means and is caused to rotate more than 90° by reason of the shape and location of the second section of said second guide means and is caused to rotate a total of 180° by reason of the shape and location of the first section of said third guide means so that the other side of said carcass is then exposed to the balance of the spray units in the housing, and said carcass then leaves said housing through the exit set of swinging doors; the spray patterns of both said reciprocating spray units and said stationary units being adjusted to strike the carcass at an angle in the range of from 15° to 75° by appropriate orientation of the nozzles thereof in relation to the vertical planes through which the sides of the carcass travel.

The invention will be more readily understood when described in conjunction with the drawings in which:

FIGURE 1 is a perspective view of one embodiment of the automatic carcass washer of the instant invention;

FIGURE 2 is a plan view of the carcass washer of FIGURE 1 taken along line 2—2;

FIGURE 3 is a partial perspective view of a reciprocating spray unit and bracket assembly therefor embodied in the washer of FIGURE 1;

FIGURE 4 is a partial side elevational view taken along line 4—4 of FIGURE 2;

FIGURE 5 is a partial side elevational view taken along line 5—5 of FIGURE 2;

FIGURE 6 is a schematic view of a reciprocating rotary spray unit and its associated drive as embodied in the washer of FIGURE 1;

FIGURE 7 is an enlarged sectional view of the reciprocating spray unit taken along line 7—7 of FIGURE 6;

FIGURE 8 is an end elevational view of the spray unit of FIGURE 6; and

FIGURE 9 is a plan view, partially in section, of another embodiment of this invention.

Referring to FIGURE 1, animal half-carcass 1 is suspended from overhead conveyor 2 by hook assembly 3. Hook assembly 3 is affixed to trolley 4 riding on rail 5 of conveyor 2. Upon approaching the automatic washer, generally denoted by 6, the half-carcass 1 comes into contact with guide rail 7. Guide rail 7 positions half-carcass 1 for entering washer 6 through swinging doors 8, 9 and 10, said doors being attached to washer 6 by means of spring-loaded double-acting hinges.

Washer 6 has a side wall 11 having therein a plurality of window openings 12. A reciprocating rotary spray unit 13 is shown mounted in only one of windows 12 for simplicity in exposition, but it is to be understood that each of windows 12 may be so equipped.

The washer of FIGURE 1 is designed with all of the spray units on one wall 11 of washer 6. This has the advantage of permitting maintenance and adjustment of the sprays from one side of washer 6. In addition, the washer 6 may be located along a blind wall, since none of the spray equipment is located on the wall opposite wall 11.

The washer 6 of FIGURE 1 has ten windows 12. Thus, ten reciprocating rotary spray units may be utilized to cleanse the half-carcass 1 which moves through washer 6. In addition, as will be described below, there are stationary spray units 34, 35 and 36 employed in a preferred embodiment.

The reciprocating rotary spray units 13 are mounted on a bracket assembly, generally designated with reference numeral 14 in FIGURE 3, which permits universal movement of the spray units 13 so as to permit the continued spray pattern of the units 13 to be adjusted according to the size and shape of the carcasses being washed.

The bracket assembly 14 for reciprocating rotary spray unit 13 is shown in detail in FIGURE 3. L-shaped guides 15 and 16 are mounted on wall 11 adjacent window 12. Transverse bar 17 is equipped with clamps 18 and 19 which are slidably mounted on guides 15 and 16 to permit vertical positioning of bar 17 in window 12. Clamps 18 and 19 are provided with thumb screws 20 and 21 to lock bar 17 in a desired location with respect to guides 15 and 16.

Reciprocating rotary spray unit 13 is mounted on slotted member 22 which is in turn rotatably attached to clamp 23 which is slidably mounted on bar 17. Bolt 26 is provided to permit rotation of member 22 with respect to bar 17, and thumb screw 25 is provided to lock clamp 23 at the desired location on bar 17.

Spray unit 13 embodies a U-shaped frame 27 which is slidably mounted on member 22 by means of threaded thumb screw 28 which engages slot 29 therein. Thus, frame 27 may be moved along member 22 or rotated with respect thereto by adjustment of screw 28.

Spray unit 13 embodies a nozzle 30 to which is attached a spray head 76, as shown in FIGURES 3, 6 and 7. Nozzle 30 is mounted on a hollow shaft 31 and the water therefor is supplied through line 32 and fitting 33. In a manner to be described below, nozzle 30 is caused to reciprocally rotate through an angle of approximately 90° by the rotation of shaft 31. In this manner, spray head 76 provides a reciprocating vertical spray pattern.

Referring to FIGURE 5, three banks of stationary sprays, 34, 35 and 36 are positioned to provide additional spray patterns on the carcass 1 moving through the housing 11. The reciprocating action of the reciprocating rotary spray units 13 perform the major portion of the cleansing in that they loosen the dirt and foreign matter on the carcass. The primary function of the stationary sprays 34, 35 and 36 is to wash away the dirt and foreign matter loosened by the reciprocating spray units 13. Deflectors 37 and 38 are positioned as shown in FIGURE 2 and these deflectors serve to deflect excess spray water back onto carcass 1 to provide additional washing action.

As carcass 1 approaches washer 6, it encounters guide rail 7. Further movement of carcass 1 along conveyor 2 causes carcass 1 to push open swinging doors 8, 9 and 10, and the carcass is introduced into the area of the spray patterns from the various spray units. The side of half-carcass 1 facing wall 11 is thus washed by the series of sprays emanating from the spray units positioned in the forward area of washer 6.

As shown in FIGURE 4, guide rail 39 is positioned above guide rail 7. It can be seen from FIGURE 2 that guide rail 39 is in the same vertical plane as the portion of rail 7 which is enclosed within washer 6. As the carcass moves along guide rails 7 and 39, the geometry of the conveyor 2 and the guide rails causes the carcass to rotate as shown in FIGURE 4. In a manner to be described in more detail below, the carcass is thereby rotated a full 180° so that as it continues along conveyor 2 in contact with guide rails 40 and 41, the other side of half-carcass 1 is exposed to the spray patterns of the various spray units located in the rear portion of washer 6. The path of half-carcass 1 through washer 6 is shown by the dotted line and arrows in FIGURE 2.

A set of swinging doors 42 and 43 are provided at the exit end of washer 6. Thus, as the carcass moves along conveyor 2 it opens doors 42 and 43.

Heretofore, the force of the water from the manually operated high pressure hoses tended to drive the dirt and foreign matter into the carcass, rather than dislodging and washing the objectionable matter away. In the present invention, the reciprocating rotary spray pattern formed by each of units 13 provides a far more efficient cleansing action. As best shown in FIGURE 2, the units are positioned so that the spray strikes the carcass at a horizontal angle of approximately 45°. The spray so directed tends to dislodge the dirt rather than driving it into the carcass. The reciprocating action of the spray also contributes to the cleansing. Since the spray is constantly in motion, it impinges on the surface of the carcass 1 with a tangential force, thereby tending to push the dirt and foreign matter along the surface which effectively dislodges the dirt. The stationary sprays from units 34, 35 and 36 washes away the dirt which is effectively dislodged by the reciprocating rotary spray units.

The nozzles 84 shown in FIGURE 5 of stationary spray units 34, 35 and 36 are oriented so that the spray patterns therefrom strike the carcass at a horizontal angle of about 45° for the reasons discussed above. The specific angle at which the various spray patterns strike the carcass is not critical, it being, primarily important to eliminate the problems associated with direct or perpendicular impingement of the spray on the carcass. Thus, although it is preferable to use an angle of 45°, the sprays may be adjusted to strike the carcass at any angle in the range of from about 15° to about 75°, with the desired range being from 30° to 60°.

FIGURE 9 depicts an alternative embodiment of the present invention. Washer 44 is of the same type as washer 6 of FIGURE 1 except that there are windows 12 on both walls 45 embodying reciprocating rotary spray units 13. This type of design obviates the need for rotating the carcass 1 since both sides will be cleansed by the action of the spray units positioned for this purpose on both walls 45.

Spray unit 13 is shown in detail in FIGURE 7, and its associated drive mechanism is shown in FIGURE 6. A pneumatic system shown generally by reference numeral 46 is employed to provide the reciprocating rotary motion to nozzle 30. A conventional air-operated motor 47 is actuated by air delivered through line 48. Shaft 49 rotates at a specified r.p.m. dictated by considerations presently described.

Shaft 49 is coupled to shaft 50 of conventional gear reducer 51 by coupling 52. Shaft 53 of reducer 51 is thus driven at a speed which is proportionally lower than that of shaft 50. Cam 54 is connected to shaft 53.

There is also provided a valve 55 having air ports 56, 57, 58 and 59. Ports 58 and 59 are connected to the discharge and return of an air supply (not shown) through hoses 60 and 61, and ports 56 and 57 are connected to spray unit 13 through hoses 82 and 83.

Valve 55 is provided with spring-loaded piston 62 which regulates the flow of air through ports 56 and 57. In one position of piston 62, port 56 is connected to air under pressure and port 57 is connected to the return line. In a second position, the connections of ports 56 and 57 are reversed.

Lever arm 63 of valve 55 is pivotable about pin 64, and the upper end of arm 63 is provided with cam follower 65 which engages cam 54. As cam 54 rotates, lever arm 63 reciprocally pivots about pin 64, thereby operating valve 55 in a manner which alternately applies air pressure to ports 56 and 57.

Hoses 82 and 83 are connected to a special type of air motor 66. Motor 66 is designed to produce reciprocating rotary power. The motor 66 is adapted to be responsive to air pressure applied at one of ports 67 and 68, and the direction of rotation of shaft 69 is dependent on which one of ports 67 and 68 receives the air under pressure. A suitable type of motor 66 is made by the Ex-Cell-O Corporation, Greenville, Ohio, and sold under the name Rotac. Rotary motion in Rotac motors is limited to an arc of 280° by a stop within the motor.

FIGURE 7 is a sectional view of spray unit 13. Shaft 31 is journaled in frame 27. Bushings 70 and 71 are provided to facilitate rotation of shaft 31. Bushings 70 and 71 are conveniently made of Teflon.

Water is supplied to the hollow interior of shaft 31 through fitting 33. Insert 72 is employed to block one end of hollow shaft 31, and is fastened to shaft 31 with pin 73.

Shaft 69 engages insert 72 and is connected thereto by any convenient means such as a key (not shown). In this manner, rotation of shaft 69 causes shaft 31 to rotate. Retaining ring 74 co-acting with shoulder 75 which bears against bushing 71 prevents undue sidewise movement of shaft 31.

Nozzle 30 is connected to shaft 31, for example by brazing, so that the interior of nozzle 30 communicates with the interior of shaft 31. In this manner, the water introduced through fitting 33 is introduced into nozzle 30. Adjusting screw 77 is provided for adjustment of the spray emanating from spray head 76.

FIGURE 8 depicts bumpers 78 and 79 which are provided to aid the reciprocating rotary motion of nozzle 30. The location and height of bumpers 78 and 79 are dictated by the design of cam 54 and serve to impair a more positive reciprocating action.

In the embodiment shown in FIGURE 2, the spray units are all on the same side of washer 6, thereby necessitating rotation of the carcass in the washer 6 in order to expose both sides to the spray pattern. As evident from FIGURE 2, guide rail 7 is encountered by the carcass 1 as it moves along conveyor 2 into washer 6. The initial section X turns the carcass 1 so that one of the broad faces bears against the rail. It is to be noted that the second section Y of guide rail 7 crosses the center-line of washer 6 and thus crosses the vertical plane developed by conveyor 2. Thus, as carcass 1 travels along conveyor 2, section Y of guide rail 7 bears against the lower portion of carcass 1 and forces it toward wall 11. In other words, carcass 1 is not hanging freely from conveyor 2, but is biased toward wall 11 by guide rail 7. There is, in a sense, a torque developed about conveyor 2 as a pivot point, with carcass 1 wanting to swing away from wall 11. Viewed from the entrance of washer 6, it can be said that carcass 1 wants to rotate clockwise about conveyor 2.

FIGURE 4 depicts rail 39 positioned slightly above rail 7. Rail 39 is provided to aid rail 7, two rails being needed because of the wide disparity in the sizes of carcasses to be cleansed in washer 6.

As seen in FIGURE 2, guide rail 7 abruptly changes direction and bends sharply away from wall 11. This last section of guide rail 7 is indicated by reference letter Z. As the carcass 1 moves toward section Z, the leading end thereof is released, and the torque discussed aboved tends to move the leading end away from wall 11. Since the trailing end of carcass 1 is still bearing against portion Y of guide rail 7, a turning movement is developed which causes the carcass 1 to follow the dotted line path shown in FIGURE 2. The position of carcass 1 at this point is also shown in FIGURE 4.

As can be seen in FIGURE 4, the impetus of the rotation of carcass 1 carries carcass through more than 90° of rotation, and as the carcass moves along conveyor 2, what formerly was the trailing end of the carcass is now the leading end.

Looking at FIGURE 2, it is seen that section XX of guide rail 41 is positioned so as to engage the leading end of carcass 1 as it continues movement along conveyor 2. Section XX of guide rail 41 completes the rotation of carcass 1 so that a full 180° turn is realized. The straight section YY of guide rail 41 serves to maintain the carcass 1 in the desired position during travel through the second half of the washer 6. Guide rail 40 is provided for the same reasons as guide rail 39.

In the usual packing house operation, it is customary to kill and prepare for delivery a large number of carcasses of the same type. That is to say, the production of a packing house contemplates a large run of a single type of animal, and this large run usually involves animals of the same approximate size. As indicated, the washer of FIGURES 1 and 2 is provided with ten windows 12, each of which embodies a single reciprocating rotary spray unit 13. The vertical position of bar 17 on guides 15 and 16 is selected for each of the windows 12 to provide a spray pattern which will strike all portions of the surface of the carcasses traveling through the washer 6.

The angular position of slotted member 22, with respect to its respective bar 17, is adjusted to provide the desired distance between the spray head 76 of the spray unit 13 and the surface of the carcasses. In general, this distance is adjusted to between six inches and one foot for optimum operation.

The angular position of spray unit 13 on its respective slotted bar 22 is adjusted to ensure that the spray pattern emanating from the spray head 76 strikes the carcass at the desired angle.

The provision of spray units 13 in the windows 12 has the advantage of providing convenient maintenance since any one of the spray units may be quickly and easily replaced from the outside while washer 6 is in operation. It is not necessary to utilize the total number of spray units provided in washer 6, this being determined by the speed at which the carcasses travel through the washer 6. Obviously, if a large throughput of carcasses is desired, then all of the spray units 13 are used.

The pneumatic system 46 shown in FIGURE 6 may be utilized to operate each of the spray units 13 employed in washer 6. In such instance, the air lines of each of spray units 13 would be connected in parallel to valve 55.

The temperature of the spray water utilized is maintained at about 110° F. in order to keep the carcass warm for the shrouding operation, i.e. for covering the carcass with canvas or cloth prior to shipment out of the plant.

The embodiments described above are intended merely as illustrative of the present invention. Variations may be made therein by one skilled in the art without departing from the spirit and scope of this invention.

What is claimed is:

1. An automatic carcass washer comprising a rectangular housing having a pair of parallel walls, and a set of spring-loaded double-acting swinging doors at the entrance and at the exit of said housing; an overhead conveyor rail parallel to said walls and extending through said housing, carcass carrying means co-acting with said rail and adapted to suspend the carcass from one end thereof and convey it through said housing; one of said walls having a plurality of window openings spaced along the length thereof; a reciprocating rotary spray unit positioned in at least one of said window openings and adapted to provide a substantially vertically moving spray pattern directed generally at the other wall, said spray unit comprising a nozzle from which the spray emanates and means for reciprocating said nozzle in a substantially vertical plane whereby a substantially vertically moving spray pattern is produced; a plurality of stationary spray units located within said housing, each of which comprises a nozzle adapted to provide a fixed spray pattern directed generally at said other wall; a first carcass guide means located at the entrance of said housing to turn the suspended carcass so that it enters the swinging doors of said housing with one of the sides thereof facing said one wall; a second carcass guide means located within said housing and extending from the entrance to approximately the longitudinal center of said housing, said second guide means being shaped so that the first section thereof is slightly angled with respect to said conveyor rail and the second section thereof is arcuate and curves toward the other of said walls, the said first section of said second guide means being laterally offset from the conveyor rail toward said one wall with the amount of offset increasing with length whereby it bears against the lower portion of the suspended carcass and progressively displaces it toward said one wall; a third carcass guide means located within said housing and longitudinally spaced from said second guide means, said third guide means extending from approximately the longitudinal center of said housing to the exit thereof, said third guide means being shaped so that the first section thereof is arcuate in shape, curving away from the other of said walls, and the second section thereof is substantially parallel to said conveyor rail and in the same vertical plane; deflector means located within said housing and disposed between said second and said third guide means and the other of said walls; whereby said carcass is introduced into said housing by said first guide means through the entrance set of swinging doors with one side of said carcass exposed to the reciprocating spray units and said fixed spray units located in the housing between the entrance and the approximate longitudinal center of the housing, said carcass moves along said second guide means and is caused to rotate more than 90° by reason of the shape and location of the second section of said second guide means and is caused to rotate a total of 180° by reason of the shape and location of the first section of said third guide means so that the other side of said carcass is then exposed to the balance of the spray units in the housing, and said carcass then leaves said housing through the exit set of swinging doors; the spray patterns of both said reciprocating spray units and said stationary units being adjusted to strike the carcass at a horizontal angle in the approximate range of from 30° to 60° by appropriate orientation of the nozzles thereof in relation to the vertical planes through which the sides of the carcass travel.

2. An automatic carcass washer comprising a housing, an overhead conveyor means adapted to transport a carcass through said housing, guide means positioned in said housing to orient the carcass so that the broad faces of the carcass are substantially parallel to the direction of travel of the carcass through the housing, a plurality of reciprocating rotary spray units positioned within said housing and oriented to direct substantially vertically moving spray patterns at the broad faces of the carcass, and respective mounting means for said spray units for positioning said spray units in a horizontal plane, said spray patterns striking the broad faces of the carcass at a horizontal angle in the approximate range of from 15° to 75°.

3. The washer of claim 2 in which a plurality of stationary spray units are positioned in said housing, said stationary units being oriented to provide spray patterns which strike the carcass at a horizontal angle in the approximate range of from 15° to 75°.

4. An automatic carcass washer comprising a housing having a pair of parallel walls, an overhead conveyor means adapted to transport a carcass through said housing, one of said walls having a plurality of window openings spaced along the length thereof, a reciprocating rotary spray unit positioned in at least one of said window openings for providing a vertically moving spray pattern, and mounting means for said spray unit for positioning and orienting said spray unit in a horizontal plane, whereby (1) the distance between the spray unit and the carcass and (2) the angle at which the spray pattern strikes the carcass may be selected as desired, vertical guide means attached to said one wall adjacent said one window opening slidably guiding said mounting means whereby the vertical position of said spray unit may be adjusted as desired.

5. An automatic carcass washer comprising a rectangular housing having a pair of parallel walls, an overhead conveyor rail parallel to said walls and extending through said housing, carcass carrying means co-acting with said rail and adapted to suspend the carcass from one thereof and convey it through said housing; one of said walls having a plurality of window openings spaced along the length thereof; a reciprocating rotary spray unit positioned in a plurality of said window openings and adapted to provide a substantially vertically moving spray pattern directed generally at the other wall at a horizontal angle in the approximate range of from 15° to 75°, a plurality of stationary spray units located within said housing providing fixed spray patterns directed generally at said other wall at a horizontal angle in the approximate range of from 15° to 75°; a carcass guide means located at the entrance of said housing to turn the suspended carcass so that it enters the swinging doors of said housing with one of the broad sides thereof facing said one wall; and carcass guide means located within said housing and adapted to rotate said carcass 180° at a point approximately midway in its travel through said housing; whereby said carcass is introduced into said housing by said first guide means with one broad side of said carcass exposed to the spray patterns of said reciprocating spray units and said fixed spray units, said carcass moves through said housing and is caused to rotate 180°, so that the other broad side of said carcass is exposed to the said spray patterns.

6. An automatic carcass washer comprising a rectangular housing having a pair of parallel walls, an overhead conveyor rail parallel to said walls and extending through said housing, carcass carrying means co-acting with said rail and adapted to suspend the carcass from one end thereof and convey it through said housing; one of said walls having a plurality of window openings spaced along the length thereof; a reciprocating rotary spray unit positioned in a plurality of said window openings and adapted to provide a substantially vertically moving spray pattern directed generally at the other wall; a plurality of stationary spray units located within said housing providing fixed spray patterns directed generally at said other walls; the spray patterns of both said reciprocating spray units and said stationary units being adjusted to strike the carcass at a horizontal angle in the approximate range of from 15° to 75°; carcass guide means located at the entrance of said housing to turn the suspended carcass so that it enters the swinging doors of said housing with one of the broad sides thereof facing said one wall; and carcass guide means located within said housing and adapted to rotate said carcass 180° at a point approximately midway in its travel through said housing; deflector means located within said housing and disposed between said second and said third guide means and the other of said walls; whereby said carcass is introduced into said housing by said first guide means with one broad side of said carcass exposed to the spray patterns of said reciprocating spray units and said fixed spray units, said carcass moves through said housing and is caused to rotate 180°, so that the other broad side of said carcass is exposed to the said spray patterns.

7. An automatic carcass washer comprising a rectangular housing having a pair of parallel walls, an overhead conveyor rail parallel to said walls and extending through said housing, carcass carrying means co-acting with said rail and adapted to suspend the carcass from one end thereof and convey it through said housing; at least one of said walls having a plurality of window openings spaced along the length thereof; reciprocating rotary spray units positioned in a plurality of said window openings and adapted to provide substantially vertically moving spray patterns directed generally at the opposite wall, each of said spray units comprising a nozzle from which the spray emanates and means for reciprocating said nozzle in a substantially vertical plane whereby a substantially vertically moving spray pattern is produced; a plurality of stationary spray units located within said housing, each of which comprises a nozzle adapted to provide a fixed spray pattern directed generally at the opposite wall; the spray patterns of both said reciprocating spray units and said stationary units being adjusted to strike the carcass at a fixed horizontal angle in the approximate range of from 30° to 60° by appropriate orientation of the nozzles thereof; a first carcass guide means located at the entrance of said housing to turn the suspended carcass so that it enters the swinging doors of said housing with one of the sides thereof facing said one wall; and carcass guide means located within said housing and adapted to guide said carcass through said housing without rotation.

References Cited by the Examiner

UNITED STATES PATENTS

| | | | |
|---|---|---|---|
| 1,146,589 | 7/15 | Morrison | 17—15 |
| 1,876,607 | 9/32 | Butterworth | 134—181 X |
| 2,041,001 | 5/36 | Knowlton | 17—11 X |
| 2,562,556 | 7/51 | Kurt | 17—1 X |
| 2,800,366 | 7/57 | Scruggs | 134—180 X |

SAMUEL KOREN, *Primary Examiner.*

LUCIE H. LAUDENSLAGER, *Examiner.*